United States Patent
Sheldon et al.

(10) Patent No.: US 10,662,368 B2
(45) Date of Patent: May 26, 2020

(54) MILLED FIBERS FOR FRACTURE SEALING PERFORMANCE IMPROVEMENT

(71) Applicant: M-I L.L.C., Houston, TX (US)

(72) Inventors: Joshua Sheldon, Richmond, TX (US); Aaron Blue, Houston, TX (US)

(73) Assignee: M-I L.L.C., Houston, TX (US)

( * ) Notice: Subject to any disclaimer, the term of this patent is extended or adjusted under 35 U.S.C. 154(b) by 0 days.

(21) Appl. No.: 15/088,395

(22) Filed: Apr. 1, 2016

(65) Prior Publication Data

US 2017/0283683 A1 Oct. 5, 2017

(51) Int. Cl.
| | |
|---|---|
| C09K 8/50 | (2006.01) |
| E21B 33/138 | (2006.01) |
| E21B 21/00 | (2006.01) |
| C09K 8/502 | (2006.01) |
| C09K 8/516 | (2006.01) |
| C09K 8/508 | (2006.01) |

(52) U.S. Cl.
CPC .............. *C09K 8/502* (2013.01); *C09K 8/508* (2013.01); *C09K 8/516* (2013.01); *C09K 2208/08* (2013.01)

(58) Field of Classification Search
None
See application file for complete search history.

(56) References Cited

U.S. PATENT DOCUMENTS

| | | | |
|---|---|---|---|
| 2,815,079 A | 12/1957 | Goins, Jr. et al. | |
| 3,375,888 A | 4/1968 | Lummus et al. | |
| 5,861,362 A * | 1/1999 | Mayeux | C09K 8/035 175/72 |
| 6,172,011 B1 * | 1/2001 | Card | C09K 8/62 507/204 |
| 2005/0017097 A1 | 1/2005 | Hans | |
| 2006/0009460 A1 | 1/2006 | Dickson et al. | |
| 2006/0035790 A1 * | 2/2006 | Okell | C09K 8/805 507/269 |
| 2012/0322695 A1 * | 12/2012 | Kefi | C09K 8/32 507/118 |
| 2016/0177167 A1 * | 6/2016 | Hundt | C09K 8/44 507/244 |

FOREIGN PATENT DOCUMENTS

WO 2011076344 A1 6/2011

* cited by examiner

*Primary Examiner* — Jeffrey D Washville

(57) ABSTRACT

A wellbore fluid may include a base fluid and milled polymeric fibers, wherein the base fluid is an oil-based fluid or an aqueous-based fluid, and wherein the milled polymeric fibers may have a length distribution in which the lowest point in the length distribution is up to about 50% of the average fiber length.

13 Claims, 3 Drawing Sheets

MILLED FIBERS FOR FRACTURE SEALING PERFORMANCE IMPROVEMENT

BACKGROUND

During the drilling of a wellbore, various fluids are used in the well for a variety of functions. The fluids may be circulated through a drill pipe and drill bit into the wellbore, and then may subsequently flow upward through wellbore to the surface. During this circulation, a drilling fluid may act to remove drill cuttings from the bottom of the hole to the surface, to suspend cuttings and weighting material when circulation is interrupted, to control subsurface pressures, to maintain the integrity of the wellbore until the well section is cased and cemented, to isolate the fluids from the formation by providing sufficient hydrostatic pressure to prevent the ingress of formation fluids into the wellbore, to cool and lubricate the drill string and bit, and/or to maximize penetration rate.

Wellbore fluids may also be used to provide sufficient hydrostatic pressure in the well to prevent the influx and efflux of formation fluids and wellbore fluids, respectively. When the pore pressure (the pressure in the formation pore space provided by the formation fluids) exceeds the pressure in the open wellbore, the formation fluids tend to flow from the formation into the open wellbore. Therefore, the pressure in the open wellbore is often maintained at a higher pressure than the pore pressure. However, when wellbore pressures are maintained above the pore pressure, the pressure exerted by the wellbore fluids may exceed the fracture resistance of the formation and fractures and induced mud losses may occur. Further, the presence and/or creation of formation fractures may result in loss of wellbore fluid, which decreases the hydrostatic pressure in the wellbore, which may in turn also allow formation fluids to enter the wellbore. As a result, the formation fracture pressure may define an upper limit for allowable wellbore pressure in an open wellbore while the pore pressure defines a lower limit. Therefore, one constraint on well design and selection of drilling fluids is the balance between varying pore pressures and formation fracture pressures or fracture gradients through the depth of the well.

As stated above, wellbore fluids are circulated downhole to remove rock, as well as deliver agents to combat a variety of issues beyond the scope of the present disclosure. The selection of the type of a wellbore fluid to be used in a drilling application involves a careful balance of both the good and bad characteristics of the wellbore fluids in the particular application and the type of well to be drilled. Frequently, the selection of a fluid may depend on the type of formation through which the well is being drilled. Fluid compositions may be water- or oil-based and may contain weighting agents, surfactants, proppants, viscosifiers, and fluid loss additives. However, fluid loss may impede wellbore operations, as fluids escape into the surrounding formation. During drilling operations, variations in formation composition may lead to undesirable fluid loss events in which substantial amounts of wellbore fluid are lost to the formation through large or small fissures or fractures in the formation or through a highly porous rock matrix surrounding the borehole. While fluid loss is often associated with drilling applications, other fluids may experience fluid loss into the formation including wellbore fluids used in completions, drill-in operations, productions.

Lost circulation is an uncontrolled flow of a wellbore fluid (such as a drilling mud) into a fractured formation, and may occur naturally in formations that are fractured, highly permeable, porous, cavernous, vugular, or can be artificially induced by excessive mud pressures. Such openings in the formation may be naturally occurring or may be induced by the pressure exerted during the pumping operations. Lost circulation should not be confused with fluid loss, which is a filtration process wherein smaller amounts of the liquid phase of a drilling fluid or cement slurry escapes into the formation, leaving the solid components behind.

Lost circulation can be an expensive and time-consuming problem. During drilling, this loss may vary from a gradual lowering of the mud level in the pits to a complete loss of returned fluid. Lost circulation may also pose a safety hazard, leading to well-control problems and the potential for environmental incidents. A particularly challenging situation arises in depleted reservoirs, in which the drop in pore pressure effectively weakens a wellbore through permeable, potentially hydrocarbon-bearing rock formation, but neighboring or inter-bedded low permeability rocks maintain their pore pressure. This can make the drilling of certain depleted zones impossible because the mud weight employed to support lower permeability rocks such as shale may exceed the fracture resistance of high permeability sands and silts. Another unintentional method by which lost circulation can result is through the inability to remove low and high gravity solids from fluids. Without being able to remove such solids, the fluid density can increase, thereby increasing the hole pressure, and if such hole pressure exceeds the formation fracture pressure, fractures and fluid loss can result. Thus, over the decades, lost circulation has been one of the most time consuming and cost inflating events in drilling operations.

Various methods have been used to restore circulation of a drilling fluid when a lost circulation event occurred, particularly the use of "lost circulation materials" (LCM) that seal or block further loss of circulation. LCM may generally be classified into several categories: surface plugging, interstitial bridging, and/or combinations thereof. In addition to traditional LCM pills, crosslinkable or absorbing polymers, and cement or gunk squeezes have also been employed to combat fluid loss downhole.

DETAILED DESCRIPTION

Figure 1:
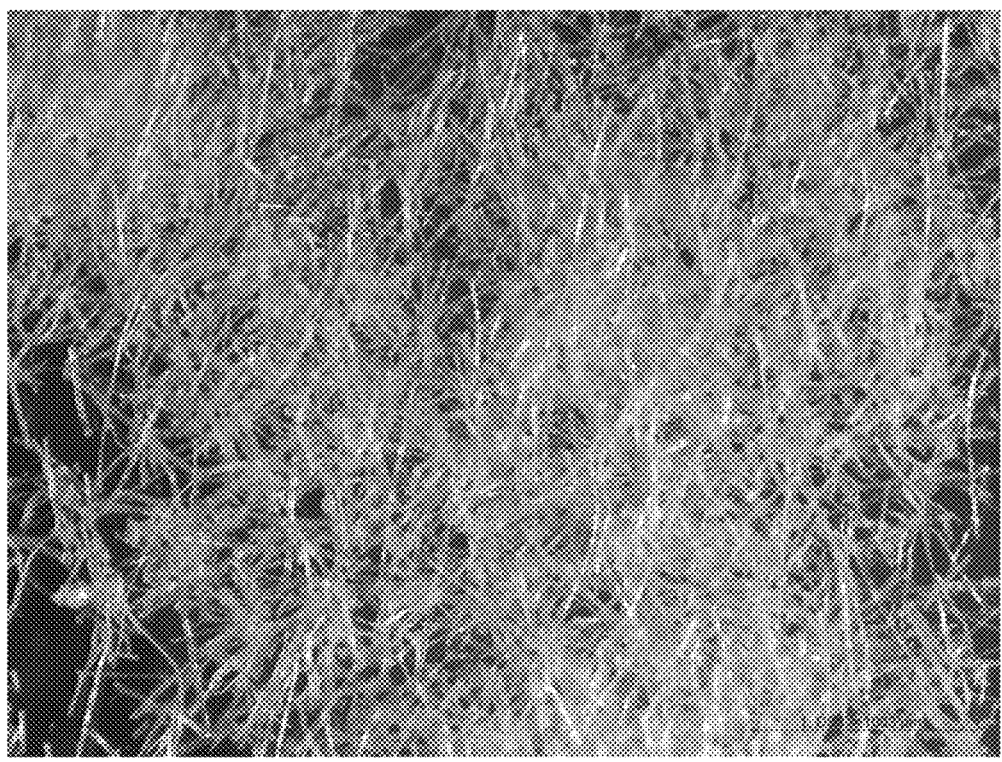
FIG. 1 shows a first optical microscopy image of a milled acrylic fiber sample, according to embodiments of the present disclosure.

Embodiments disclosed herein relate generally to methods of treating fluid loss in downhole formations. More specifically, embodiments disclosed herein relate to wellbore fluid compositions that include at least some polymeric fibers that are milled prior to their addition to the wellbore fluid composition. The inventors of the present disclosure have found that the presence of milled polymer fibers in the wellbore fluid composition may allow for effective sealing of fractures that are wider than conventionally thought possible given the milled fiber length. For example, it is conventional wisdom in the industry that the length of fiber based lost circulation materials used to seal fractures within a formation should be about double the fracture width in order to be effective in sealing said fractures. However, in the present disclosure wellbore fluids including milled polymeric fibers having lengths that are actually shorter than a fracture width have been found to successfully seal said fracture.

Polymeric fibers are commonly produced by a plastic extrusion process whereby a molten polymer resin feedstock is forced through a plurality of dies, which forms the resin into the desired fiber shape (e.g., diameter and cross-section geometry). After passing through the die, the extruded polymer is cooled and solidifies while having a consistent tension applied thereto to maintain the overall quality of the polymeric fibers produced. Specifically, the application of consistent tension to the extruded fibers ensures fiber uniformity and a regular fiber cut length. Thus, commercially available polymeric fibers are produced in grades having specific and uniform lengths, diameters, and cross-section geometry. In conventional compositions to address lost circulation, the polymeric fiber uniformity in commercially available fibers would be advantageous because, as mentioned above, it has been commonly thought that the optimal fiber length needed for sealing a fracture is roughly two times the fracture width. Thus, an operator may conveniently select a particular grade (length) of polymeric fibers to address a fracture if an estimate of the fracture width is known through rock mechanics models and wellbore pressure tracking.

In one or more embodiments, the milled polymeric fibers disclosed herein are the products of subjecting the extruded and uniform conventionally available fibers to a milling process. For example, the milling process may be accomplished using a hammermill that includes a rotating assembly of hammers and an outer screen, where the uniform extruded fibers are subjected to milling by spinning hammers that shred the fibers until they are broken down to a point where they pass through the outer screen and out of the mill. However, any mill may be used wherein, during the milling process, the uniformity of the commercial fibers is destroyed and a milled fiber product is produced that features fibers with a variety of lengths. The lengths of the milled fiber product will generally depend upon the starting length of the uniform fibers and the amount of time spent milling the uniform fibers. Specifically, the longer that the fibers are milled, the larger the percentage of fibers having a length shorter than the original fiber length will be. Additionally, the average length of the fibers will decrease as the time spent milling the fibers is increased.

Figure 2:
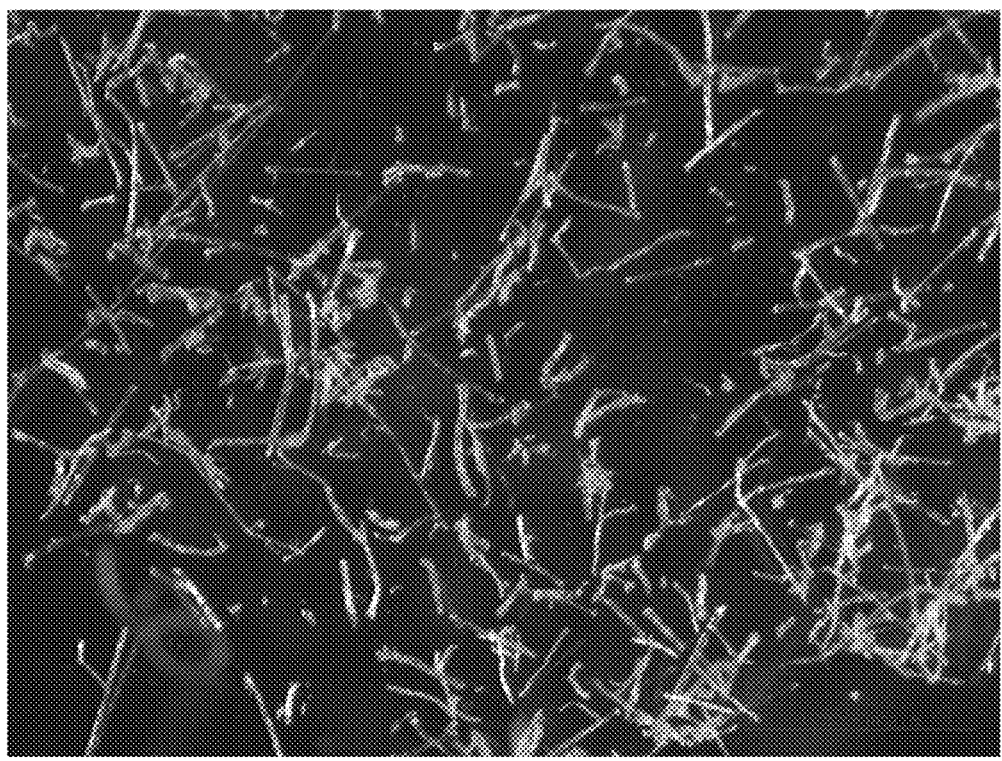
FIG. 2 shows a second optical microscopy image of a milled acrylic fiber sample, according to embodiments of the present disclosure.
Figure 3:
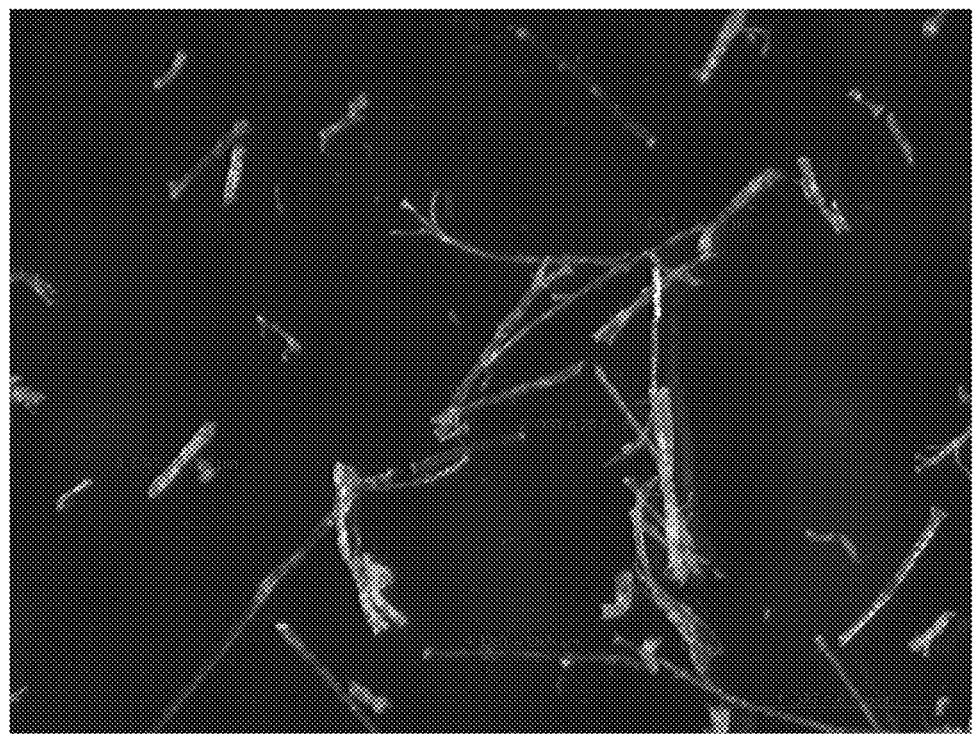
FIG. 3 shows a third optical microscopy image of a milled acrylic fiber sample, according to embodiments of the present disclosure.
Figure 4:
FIG. 4 shows a fourth optical microscopy image of a milled acrylic fiber sample, according to embodiments of the present disclosure.

Another feature of the milled fibers of one or more embodiments of the present disclosure that is not present in the conventional uniform fibers is the presence of a fiber surface/end roughness that arises as the fibers are broken down and fray during the milling process. For example, FIGS. 1-4 show optical microscopy images of a milled acrylic fiber sample. FIG. 1 shows a broad view of a milled fiber sample. FIG. 2 shows a similarly magnified image (i.e., the scale is the same) of a more sparsely populated area, more clearly showing the heterogeneity of the milled fibers in both their length and their surface features. FIGS. 3 and 4 show a more magnified view of a milled fiber sample, which further demonstrates the milled fibers' non-uniformity in length and surface/end roughness.

Figure 5:
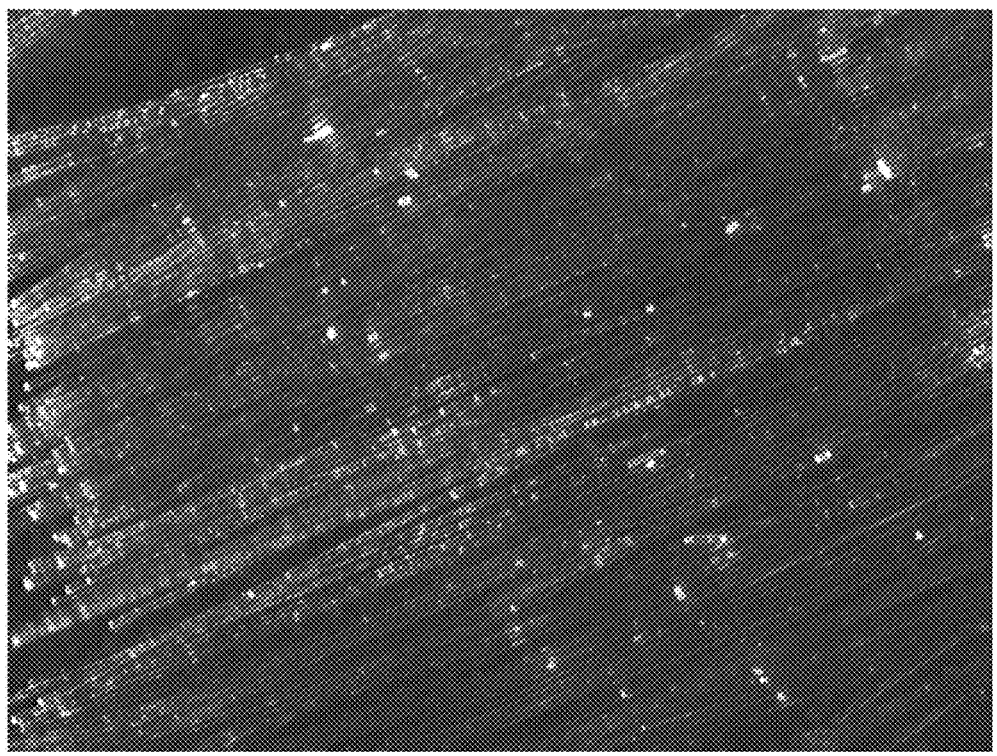
FIG. 5 shows a first optical microscopy image of a non-milled acrylic fiber sample, for comparison to milled acrylic fibers according to embodiments of the present disclosure.
Figure 6:
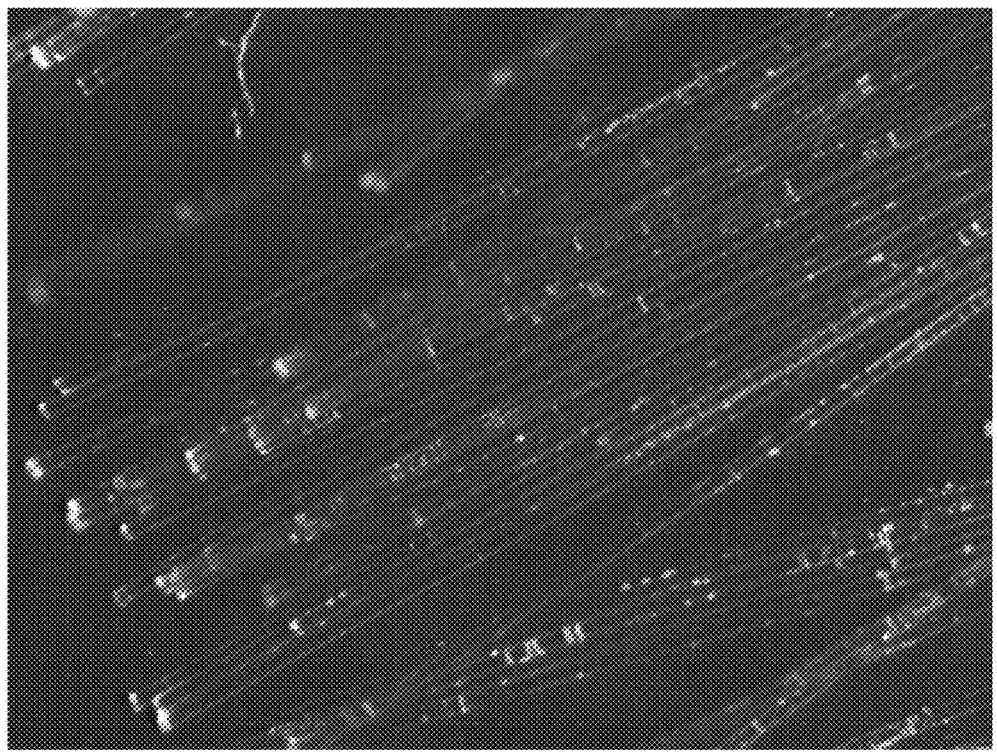
FIG. 6 shows a second optical microscopy image of a non-milled acrylic fiber sample, for comparison to milled acrylic fibers according to embodiments of the present disclosure.

In contrast, due to the controlled nature of the extrusion process, conventional fibers are uniform, possessing a small length distribution (e.g., essentially all the fibers having substantially the same length) and a smooth surface with clean cut ends. FIGS. 5 and 6 show optical microscopy images of conventional non-milled and uniform acrylic fibers. As shown, the fibers are highly uniform, being relatively straight with smooth surfaces showing little indication of the fraying seen in the milled version.

In one or more embodiments, the milled fibers used may be selected from milled fibers of the group of polyesters, acrylic polymers, polyamides, polyolefins, polyaramides, polyurethanes, vinyl polymers, glass fibers, carbon fibers, regenerated cellulose (rayon), natural fibers or blends thereof. In one or more embodiments, the milled fibers may be substantially stable in the downhole environment and have chemical resistance to acidic or basic conditions along with aqueous solvents and/or organic solvents. Further, for use in the downhole environment the milled polymeric fibers of the present disclosure may have excellent mechanical strength and high temperature stability. For example, the milled polymeric fibers may have a softening temperature in the range of about 250-300° F. (~120-150° C.) and a melting temperature of at least about 350° F. (~175° C.).

In one or more embodiments, the milled polymeric fibers used in the present disclosure may have at least some fibers having lengths that are less than a fracture width to be sealed. For example, in some embodiments, up to about 10%, or up to about 20%, or up to about 30, or up to about 40%, or up to about 50%, or up to about 60% of the milled fibers may have a length that is smaller than the estimated fracture width to be sealed. In one or more embodiments, up to about 90%, or up to about 80%, or up to about 70%, or up to about 60%, or up to about 50%, or up to about 40% of the milled fibers have a length that is longer than the estimated fracture width to be sealed. Fracture widths for a given well may be estimated based on rock mechanics models and wellbore pressures, or offset well data including logs, and the like.

In one or more embodiments, the milled polymeric fibers used in the present disclosure may have a fiber length distribution in which the lowest point in the length distribution is up to about 50% of the average fiber length, while the highest point in the fiber length distribution is at least 150% of the average fiber length. For example, if the average fiber length was 750 microns, then the length distribution for the fibers would at least be as broad as from about 375 microns to about 1125 microns. In some embodiments, the milled fibers may have a length distribution in which the lowest point in the fiber length distribution is up to about 40% of the average fiber length, or up to about 30% of the average fiber length, or up to about 25% of the average fiber length. In some embodiments, the milled fibers may have a length distribution in which the highest point in the fiber length distribution is at least about 160% of the average fiber length, or at least about 170% of the average fiber length, or at least about 180% of the average fiber length, or at least about 190% of the average fiber length, or at least about 200% of the average fiber length. Thus, for an average length of 750 microns the milled polymeric fibers may have a length distribution of about 200 microns to 1500 microns. In one or more embodiments, in addition to using milled fibers, non-milled uniform polymeric fibers may be blended with milled fibers to create a fiber blend with a desired length distribution, such as a length distribution described above.

In one or more embodiments, the milled polymeric fibers of the present disclosure may be added to a base fluid to form a wellbore fluid capable of treating lost circulation. In one or more embodiments, the milled polymeric fibers may be present in a wellbore fluid in amounts from about 0.1 pounds per barrel (ppb) to about 10 ppb, or from about 0.15 ppb to about 8 ppb, or from about 0.2 ppb to about 6 ppb, or from about 0.25 to about 4 ppb. The wellbore fluid may be applied as a pill when lost circulation is identified, or the wellbore fluid may include the milled fibers as a background LCM that can be used to treat lost circulation as it develops. In one or more embodiments, the base fluid used with the milled polymeric fibers may be an oil-based or oleaginous fluid or the base fluid may be an aqueous-based or non-oleaginous fluid.

In some embodiments, the base fluids described herein may be oil-based wellbore fluids, such as an invert emulsion where a non-oleaginous fluid is emulsified within an oleaginous continuous fluid. Suitable oleaginous fluids may be a natural, mineral or synthetic oil and in some embodiments, the oleaginous fluid may be selected from the group including petroleum oil, a natural oil, a mineral oil, a silicone oil, a synthetically derived oil, such as hydrogenated and unhydrogenated olefins including polyalpha olefins, linear and branch olefins and the like, polydiorganosiloxanes, siloxanes, or organosiloxanes, esters of fatty acids, specifically straight chain, branched and cyclical alkyl ethers of fatty acids, mixtures thereof and similar compounds known to one of skill in the art and mixtures thereof.

As mentioned above, the wellbore fluid may be an invert emulsion having a continuous oleaginous phase and a discontinuous aqueous (or non-oleaginous liquid) phase, among other substances and additives. Non-oleaginous liquids may, in one or more embodiments (including those where the base fluid is an aqueous-based fluid), include at least one of fresh water, sea water, brine, mixtures of water and water-soluble organic compounds, and mixtures thereof. In various embodiments, the non-oleaginous fluid may be a brine, which may include seawater, aqueous solutions wherein the salt concentration is less than that of sea water, or aqueous solutions wherein the salt concentration is greater than that of sea water. Salts that may be found in seawater include, but are not limited to, sodium, calcium, aluminum, magnesium, potassium, strontium, and lithium salts of chlorides, bromides, carbonates, iodides, chlorates, bromates, formates, nitrates, oxides, sulfates, silicates, phosphates and fluorides. Salts that may be incorporated in a brine include any one or more of those present in natural seawater or any other organic or inorganic dissolved salts. Additionally, brines that may be used in the drilling fluids disclosed herein may be natural or synthetic, with synthetic brines tending to be much simpler in constitution.

The amount of oleaginous liquid in the invert emulsion fluid may vary depending upon the particular oleaginous fluid used, the particular non-oleaginous fluid used, and the particular application in which the invert emulsion fluid is to be employed. However, in some embodiments, the amount of oleaginous liquid may be sufficient to form a stable emulsion when used as the continuous phase. The amount of non-oleaginous liquid in the invert emulsion fluid may vary depending upon the particular non-oleaginous fluid used, the emulsifier selected to stabilize the non-oleaginous phase, and the particular application in which the invert emulsion fluid is to be employed.

In one or more embodiments, an additional LCM may be added to the wellbore fluid containing the milled polymeric fibers therein. For example, the wellbore fluid may also include flaky and granular materials, as well as their blended compositions, that may include paper, mica, cellophane, nut shells, coarse graphite/carbon and calcium carbonate. The type and concentration of these additional LCM materials may depend on the particular type of well conditions observed and may be tailored appropriately.

Other additives that may be included in the wellbore fluids disclosed herein include for example, weighting agents, wetting agents, organophilic clays, viscosifiers, surfactants, dispersants, interfacial tension reducers, pH buffers, mutual solvents, thinners, thinning agents and cleaning agents. The addition of such agents should be well known to one of ordinary skill in the art of formulating drilling fluids and muds.

Emulsifiers that may be used in the fluids disclosed herein include, for example, fatty acids, soaps of fatty acids, amidoamines, polyamides, polyamines, oleate esters, such as sorbitan monoleate, sorbitan dioleate, imidazoline derivatives or alcohol derivatives and combinations or derivatives of the above. Additionally, lime or other alkaline materials may be added to conventional invert emulsion drilling fluids and muds to maintain a reserve alkalinity.

Wetting agents that may be suitable for use in the fluids disclosed herein include crude tall oil, oxidized crude tall oil, surfactants, organic phosphate esters, modified imidazolines and amidoamines, alkyl aromatic sulfates and sulfonates, and the like, and combinations or derivatives of these.

Organophilic clays, normally amine treated clays, may be useful as viscosifiers and/or emulsion stabilizers in the fluid composition disclosed herein. Other viscosifiers, such as oil soluble polymers, polyamide resins, polycarboxylic acids and soaps can also be used. The amount of viscosifier used in the composition can vary upon the end use of the composition. However, normally about 0.1% to 6% by weight range is sufficient for most applications.

The wellbore fluid of the present disclosure additionally includes a weighting material, sometimes referred to as a weighting agent. Weighting agents are conventionally used in wellbore fluids to balance the pressure requirements of the well. Weighting agents may be selected from one or more of the materials including, for example, barite, hematite, iron oxide, calcium carbonate, magnesium carbonate, organic and inorganic salts of magnesium, calcium chloride, calcium bromide, magnesium chloride, zinc halides and combinations thereof.

Conventional methods can be used to prepare the wellbore fluids disclosed herein, in a manner analogous to those normally used to prepare conventional oil-based wellbore fluids. In one embodiment, a desired quantity of oleaginous fluid such as a base oil and a suitable amount of an emulsifier are mixed together and the remaining components are added sequentially with continuous mixing. An invert emulsion may also be formed by vigorously agitating, mixing or shearing the oleaginous fluid and the non-oleaginous fluid.

Application of LCM-forming components adjacent a permeable formation may be accomplished by methods known in the art. For example, "thief zones" or permeable intervals will often be at or near the bottom of the wellbore and will begin to absorb wellbore fluids when exposed during drilling operations. In such situations, a LCM treatment may be spotted adjacent the permeable formation by pumping a slug or pill of the treatment down and out of the drill pipe or drill bit as is known in the art. It may be, however, that the permeable formation is at a point farther up in the wellbore, which may result, for example, from failure of a previous seal. In such cases, the drill pipe may be raised as is known in the art so that the pill or slug of the LCM treatment may be deposited adjacent the permeable formation. The volume of the slug of LCM treatment that is spotted adjacent the permeable formation may range from less than that of the open hole to more than double that of the open hole.

Embodiments of the present disclosure may provide wellbore fluids and methods of reducing lost circulation with such wellbore fluids that are capable of reducing lost circulation with milled fibers that have a portion of fibers with lengths less than the actual fracture width. Importantly, this may improve the rheological properties of said wellbore fluids and thereby reduce equipment failure, borehole assembly plugging, and shaker loss. Additionally, using the wellbore fluids of the present disclosure it may be possible to treat lost circulation with less milled fibers when compared to conventional non-milled fibers. Without being bound by theory, it is believed that the milling process affords the fibers with a length distribution and surface roughness/fraying that facilitates the agglomeration and plugging of the fibers within the loss zones more efficiently than their non-milled counterparts. However, because of the rheological improvements afforded by using milled fibers with larger length distributions, and thus a portion of the fiber being shorter than conventional fibers, it may also be possible to formulate wellbore fluids with a greater quantity of milled fibers than a fluid having only conventional non-milled fibers.

Although only a few example embodiments have been described in detail above, those skilled in the art will readily appreciate that many modifications are possible in the example embodiments without materially departing from this disclosure. Accordingly, all such modifications are intended to be included within the scope of this disclosure as defined in the following claims.

What is claimed:

1. A wellbore fluid, comprising:
   a base fluid;
   milled polymeric fibers consisting of acrylic polymers; and
   wherein the milled polymeric fibers have widths, lengths greater than said widths, a length distribution in which a lowest point in the length distribution is up to about 50% of an average fiber length, frayed and roughened surfaces, and a heterogeneity in both the lengths and the frayed and roughened surfaces of the milled polymeric fibers.

2. The wellbore fluid of claim 1, wherein the base fluid is an invert emulsion.

3. The wellbore fluid of claim 1, wherein the milled polymeric fibers are present in amounts of about 0.1 to 10 pounds per barrel of the wellbore fluid.

4. The wellbore fluid of claim 1, wherein the milled polymeric fibers have at least one of a softening temperature in the range of about 250-300° F. and a melting temperature of at least about 350° F.

5. The wellbore fluid of claim 1, wherein the milled polymeric fibers have a length distribution in which the highest point in the length distribution is at least 150% of the average fiber length.

6. The wellbore fluid of claim 1, wherein the milled polymeric fibers have a length distribution that is at least as wide as about 300 microns to 1750 microns.

7. The wellbore fluid of claim 1, further comprising:
   non-milled uniform polymeric fibers.

8. The wellbore fluid of claim 1, further comprising:
   at least one of paper, mica, cellophane, nut shells, coarse graphite/carbon, and calcium carbonate.

9. The wellbore fluid of claim 1, further comprising:
   at least one of weighting agents, wetting agents, organophilic clays, viscosifiers, surfactants, dispersants, interfacial tension reducers, pH buffers, mutual solvents, thinners, thinning agents and cleaning agents.

10. A wellbore fluid, comprising:
    a base fluid;
    milled polymeric fibers selected from a group consisting of polyesters, acrylic polymers, polyamides, polyolefins, polyaramides, polyurethanes, vinyl polymers, regenerated cellulose (rayon), natural fibers, and blends thereof and having a length distribution in which the lowest point in the length distribution is up to about 50% of the average fiber length or the highest point in the length distribution is at least 150% of the average fiber length;
    one or more emulsifiers selected from the group consisting of fatty acids, soaps of fatty acids, amidoamines, polyamides, polyamines, oleate esters, combinations thereof, and derivatives thereof; and
    one or more viscosifiers selected from the group consisting of organophilic clays, oil soluble polymers, polyamide resins, polycarboxylic acids, and polycarboxylic acid soaps and present at a concentration ranging from 0.1% to 6% by weight, calculated to a total of the wellbore fluid.

11. The wellbore fluid of claim 10, wherein the milled polymeric fibers have a length distribution that is at least as wide as about 300 microns to 1750 microns.

12. A wellbore fluid, comprising:
    a base fluid that is an invert emulsion; and
    milled polymeric fibers consisting of acrylic polymers, wherein the milled polymeric fibers have widths, lengths greater than said widths, a length distribution in which a lowest point in the length distribution is up to about 50% of an average fiber length, frayed and roughened surfaces and a heterogeneity in both the lengths and the frayed and roughened surfaces of the milled polymeric fibers.

13. The wellbore fluid of claim 10, wherein the one or more viscosifiers comprises amine treated clays.

* * * * *